United States Patent
Yoon et al.

(10) Patent No.: US 9,986,171 B2
(45) Date of Patent: May 29, 2018

(54) METHOD AND APPARATUS FOR DUAL EXPOSURE SETTINGS USING A PIXEL ARRAY

(71) Applicant: Samsung Electronics Co., Ltd., Gyeonggi-do (KR)

(72) Inventors: Young-Kwon Yoon, Seoul (KR); Hwa-Young Kang, Gyeonggi-do (KR); Moon-Soo Kim, Seoul (KR); Tae-Ho Kim, Chungcheongbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 14/865,235

(22) Filed: Sep. 25, 2015

(65) Prior Publication Data
US 2016/0094797 A1  Mar. 31, 2016

(30) Foreign Application Priority Data
Sep. 30, 2014 (KR) .................. 10-2014-0131586

(51) Int. Cl.
*H04N 5/235* (2006.01)
*H04N 5/355* (2011.01)

(52) U.S. Cl.
CPC ....... *H04N 5/2353* (2013.01); *H04N 5/35554* (2013.01)

(58) Field of Classification Search
CPC .................. H04N 5/2353; H04N 5/35554
See application file for complete search history.

(56) References Cited

U.S. PATENT DOCUMENTS

| | | | |
|---|---|---|---|
| 7,990,429 B2 * | 8/2011 | Saito | H04N 5/232 348/222.1 |
| 2006/0291844 A1 * | 12/2006 | Kakkori | H04N 5/2352 396/89 |
| 2012/0098938 A1 * | 4/2012 | Jin | H04N 13/0271 348/47 |
| 2013/0002941 A1 | 1/2013 | Park et al. | |
| 2013/0057740 A1 * | 3/2013 | Takaiwa | H04N 5/2354 348/297 |
| 2014/0125863 A1 * | 5/2014 | Toyoda | H04N 5/2355 348/362 |
| 2014/0184894 A1 * | 7/2014 | Motta | H04N 5/2353 348/362 |
| 2014/0218559 A1 * | 8/2014 | Yamaguchi | H04N 5/2352 348/229.1 |

(Continued)

FOREIGN PATENT DOCUMENTS

| | | |
|---|---|---|
| KR | 10-0322249 B1 | 6/2002 |
| KR | 10-2013-0002699 A | 1/2013 |

*Primary Examiner* — Gevell Selby
(74) *Attorney, Agent, or Firm* — Cha & Reiter, LLC

(57) ABSTRACT

An electronic device is provided including an image sensor that includes a pixel array, and a processor configured to control operations of: obtaining an image data set; processing the image data set to identify a first portion of the pixel array that is associated with a first subject and a second portion of the pixel array; and capturing an image by operating the first portion of the pixel array in accordance with a first exposure setting value and operating the second portion of the pixel array in accordance with a second exposure setting value.

21 Claims, 13 Drawing Sheets

(56) References Cited

U.S. PATENT DOCUMENTS

2014/0347532 A1\* 11/2014 Kang ................. H04N 5/351
                                                    348/294
2015/0181107 A1\* 6/2015 Park ................. H04N 5/2353
                                                    348/353

\* cited by examiner

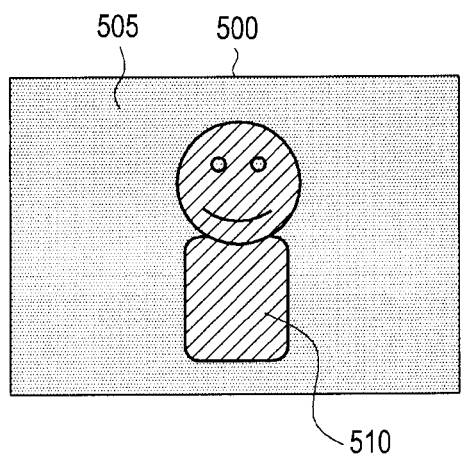 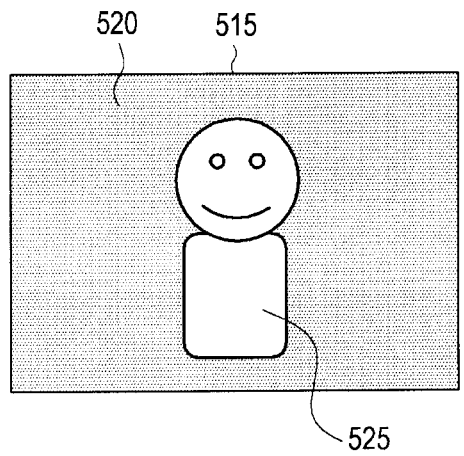
FIG.5A  FIG.5B
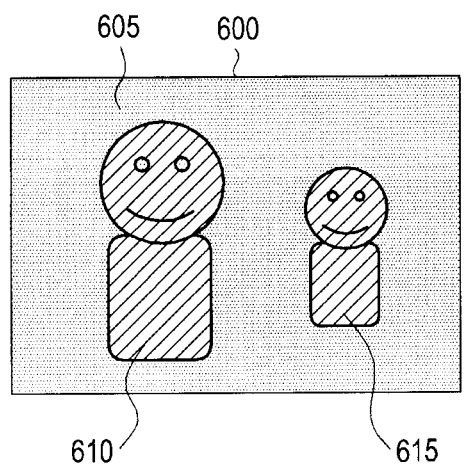 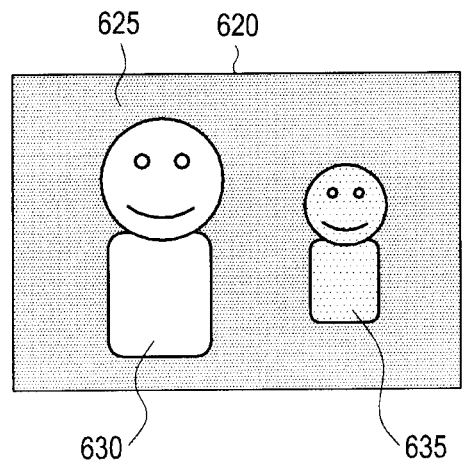
FIG.6A  FIG.6B

METHOD AND APPARATUS FOR DUAL EXPOSURE SETTINGS USING A PIXEL ARRAY

CLAIM OF PRIORITY

This application claims the priority under 35 U.S.C. § 119(a) to Korean Application Serial No. 10-2014-0131586, which was filed in the Korean Intellectual Property Office on Sep. 30, 2014, the entire content of which is hereby incorporated by reference.

TECHNICAL FIELD

The present disclosure relates to electronic devices, and more particularly to a method and apparatus for capturing images.

BACKGROUND

Recently, the rapid advances of imaging devices have accelerated the development of various photographing devices, such as cameras, or camcorders, which adopt image sensors. The photographing devices are widely used since it is convenient for images to be photographed, stored, and reproduced in and from a recording medium any time. Therefore, user demands for performance and functions of the photographing devices are gradually increasing, and there is a growing trend towards photographing devices of high performance and various functions as well as small, light, and low-power consuming photographing devices.

The photographing devices basically adopt automatic functions, such as an auto-focus (AF) function and an auto-exposure (AE) function.

SUMMARY

According to aspects of the disclosure, an electronic device is provided comprising an image sensor that includes a pixel array, and a processor configured to control operations of: obtaining an image data set; processing the image data set to identify a first portion of the pixel array that is associated with a first subject and a second portion of the pixel array; and capturing an image by operating the first portion of the pixel array in accordance with a first exposure setting value and operating the second portion of the pixel array in accordance with a second exposure setting value.

According to aspects of the disclosure, a method for capturing images by using an image sensor having an array of pixels, the method comprising: obtaining an image data set by using the array of pixels; processing the image data set to identify a first portion of the pixel array that is associated with a first subject and a second portion of the pixel array; and capturing an image by operating the first portion of the pixel array in accordance with a first exposure setting value and operating the second portion of the pixel array in accordance with a second exposure setting value.

BRIEF DESCRIPTION OF THE DRAWINGS

The above and other aspects, features, and advantages of the present disclosure will be more apparent from the following detailed description taken in conjunction with the accompanying drawings, in which:

FIG. 5A is a diagram of an example of an image that is captured without using a flash, according to various embodiments of the present disclosure;

FIG. 5B is a diagram of an example of an image that is captured while using a flash, according to various embodiments of the present disclosure;

FIG. 6A is a diagram of an image that is captured without using a flash, according to various embodiments of the disclosure;

FIG. 6B is a diagram of an image that is captured while using a flash, according to various embodiments of the disclosure;

DETAILED DESCRIPTION

Figure 1:
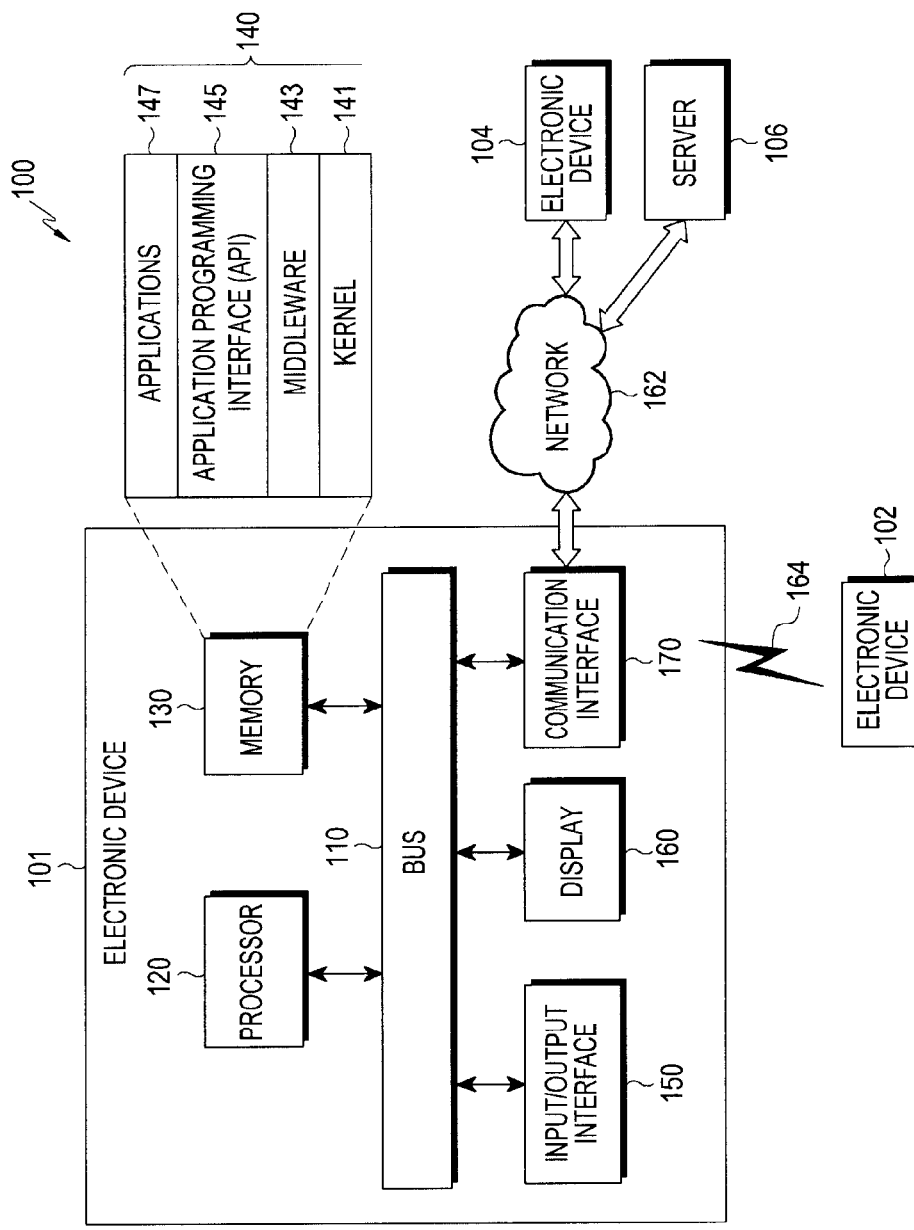
FIG. 1 is a block diagram of an example of an electronic device, according to various embodiments of the present disclosure.

Hereinafter, the present disclosure will be described with reference to the accompanying drawings. Although specific embodiments are illustrated in the drawings and related detailed descriptions are discussed in the present disclosure, the present disclosure may have various modifications and several embodiments.

Accordingly, the present disclosure is not limited to a specific implementation form and it should be understood that the present disclosure includes all changes or equivalents and substitutes included in the spirit and scope of the present disclosure. In connection with descriptions of the drawings, similar components are designated by the same reference numeral.

The expressions such as "include" and "may include" which may be used in the present disclosure denote the presence of the disclosed functions, operations, and constituent elements and do not limit one or more additional functions, operations, and constituent elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Furthermore, in the present disclosure, the expression "and/or" includes any and all combinations of the associated listed words. For example, the expression "A and/or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when a element is referred to as being "directly coupled" or "directly connected" to any other element, it should be understood that no element is interposed therebetween. The terms used in the present disclosure are only used to describe specific embodiments, and are not intended to limit the present disclosure. As used herein, the singular forms are intended to include the plural forms as well, unless the context clearly indicates otherwise.

Hereinafter, an electronic sensor according to various embodiments of the present disclosure will be described with reference to the accompanying drawings. A camera module including the electronic sensor according to the embodiments of the present disclosure, for example, an image sensor may be mounted to an electronic device. Such an electronic device may be provided with a camera, a camcorder, a web camera, a surveillance camera, a medical camera, a high speed camera, a multi-camera such as a 3D camera, or the like.

The electronic device according to various embodiments of the present disclosure may include a device having a communication function. For example, the electronic device may include a combination of one or more of various devices such as a smart phone, a tablet personal computer (PC), a mobile phone, a video phone, an e-book reader, a desktop PC, a laptop PC, a net-book computer, a Personal Digital Assistant (PDA), a Portable Multimedia Player (PMP), an MP3 player, a mobile medical device, a wearable device (e.g., a Head-Mounted-Device (HMD) such as electronic glasses, electronic clothing, an electronic clock, a wrist watch, an electronic bracelet, an electronic necklace, an electronic appcessory, and a smart watch), a home appliance (e.g., a refrigerator, an air-conditioner, a vacuum cleaner, an oven, a microwave oven, a washing machine, an air cleaner, and/or the like), an artificial intelligence robot, a Television (TV), a Digital Video Disk (DVD) player, an audio, various medical devices (e.g., a Magnetic Resonance Angiography (MRA), a Magnetic Resonance Imaging (MRI), a Computed Tomography (CT), a movie camera, an ultrasonic device, and/or the like), a navigation device, a Global Positioning System (GPS) receiver, an Event Data Recorder (EDR), a Flight Data Recorder (FDR), a set-top box, a TV box (e.g., a Samsung HomeSync™, an Apple TV™, or a Google TV™), an electronic dictionary, a vehicle infotainment device, electronic equipment for a ship (e.g., navigation equipment for a ship, a gyrocompass, and/or the like), an avionics, security equipment, electronic clothing, an electronic key, a camcorder, a game consoles, a flat panel display device, an electronic picture frame, an electronic album, furniture or a part of a building/structure including a communication function, an electronic board, an electronic signature receiving device, a projector, and/or the like. Also, an electronic device according to various embodiments of the present disclosure is not limited to the above described devices.

Hereinafter, an electronic device according to various embodiments of the present disclosure will be described with reference to the accompanying drawings. In the present disclosure, the term "user" may indicate a person using an electronic device or a device (e.g. an artificial intelligence electronic device) using an electronic device.

Referring to FIG. 1, the electronic device 101 in a network environment 100 is provided according to various embodiments of the present disclosure. The electronic device 101 may include a bus 110, a processor 120, a memory 130, an input/output interface 150, a display 160, and a communication interface 170. In some embodiments, the electronic device 101 may exclude at least one of the elements or may further include other elements.

The bus 110, for example, may be a circuit for connecting elements 110 to 170 above with each other and transferring communication data (e.g., control messages) between the elements 110 to 170.

The processor 120 may include any suitable type of processing circuitry, such as one or more of a central processing unit (CPU), an application processor (AP), and a communication processor (CP). The processor 120 may perform calculation or data processing related to a control and/or communication of at least one of other elements in the electronic device 101.

The processor 120 may be referred to as a controller, or may include the controller.

The processor 120 according to various embodiments of the present disclosure, is configured to process image data. More specifically, the processor 120 may identify at least one subject area in image data, and may control an image sensor to have different exposures with respect to the subject area.

The memory 130 may include a volatile memory and/or a non-volatile memory. The memory 130 may store instructions or data related to at least one of other elements in the electronic device 101. According to an embodiment of the present disclosure, the memory 130 may store software and/or programs 140. The programs 140 may include, for example, a kernel 141, a middleware 143, an application programming interface (API) 145, and/or application programs (or applications) 147. At least some of the kernel 141, the middleware 143, or the API 145 may be referred to as an operating system (OS).

The kernel 141 may control or manage system resources (e.g., the bus 110, the processor 120, the memory 130, or the like) that are used in performing operations or functions implemented by other programs (e.g., the middleware 143, the API 145 or the application programs 147). Furthermore, the kernel 141 may provide an interface by which the middleware 143, the API 145 or the application programs 147 may access each element of the electronic device 101 to control or manage system resources.

The middleware 143 may play the intermediate role between the API 145 or the application programs 147 and the kernel 141 to communicate with each other for transmission and reception of data. Furthermore, in relation to requests for operations received from the application programs 147, the middleware 143 may control (e.g., scheduling or load-balancing) the requests, for example, by giving priority for using system resources (e.g., the bus 110, the processor 120, the memory 130, or the like) of the electronic device 101 to at least one of the application programs 147.

The API 145 is an interface by which the applications 147 controls functions provided from the kernel 141 or the middleware 143, and it may include, for example, at least one interface or function (e.g., instructions) for file control, window control, image processing, or text control.

The input/output interface 150 may transfer instructions or data input from, for example, a user or external devices to other elements 110 to 140 or 160 and 170 of the electronic device 101. In addition, the input/output interface 150 may output instructions or data, which are received from other elements 110 to 140 or 160 and 170 of the electronic device 101 to a user or external devices.

The display 160, for example, may include a liquid crystal display (LCD), a light-emitting diode (LED) display, an organic light-emitting diode (OLED) display, a micro-electromechanical systems (MEMS) display, an electronic paper display, or the like. The display may display various pieces of content information (e.g., text, images, videos, icons, symbols, or the like) to a user. The display 160 may include a touch screen, and may receive a touch input, gestures, a proximity input, or a hovering input using, for example, electronic pens or body parts of the user.

The communication interface 170 may perform a communication-connection between the electronic device 101 and external devices (e.g., the first external electronic device 102, the second external electronic apparatus 104 or the server 106). For example, the communication interface 170 may be connected to a network 162 through wireless communication 164 or wired communication to thereby communicate with the external devices (e.g., the second external electronic device 104 or the server 106).

The wireless communication may use, as a cellular communication protocol, at least one of LTE, LTE-A, CDMA, WCDMA, UMTS, WiBro, or GSM. The wired communication may include at least one of a universal serial bus (USB), a high definition multimedia interface (HDMI), recommended standard 232 (RS-232), or a plain old telephone service (POTS). The network 162 may include at least one of telecommunication networks such as a computer network (e.g., LAN or WAN), the Internet, or a telephone network.

The first and the second external electronic devices 102 and 104 may be the same as or different from the electronic device 101. According to an embodiment of the present disclosure, the server 106 may include a group of one or more servers.

According to various embodiments of the present disclosure, all of or some of the operations executed in the electronic device 101 may be performed by one or more of other electronic devices (e.g., the electronic devices 102 and 104, or the server 106). According to an embodiment of the present disclosure, when the electronic device 101 is required to execute some functions or services automatically or by a request, the electronic device 101 may make a request to other devices (e.g., the electronic devices 102 and 104, or the server 106) for performing at least some functions related thereto while executing the functions or the services by itself, or without executing the functions or the services by itself. The other electronic device (e.g., the electronic devices 102 and 104, or the server 106) may execute the requested functions or the additional functions, and may transfer the result thereof to the electronic device 101. The electronic device 101 may process the received result to thereby provide the requested functions or services. To this end, for example, technologies of cloud computing, distributed computing, or client-server computing may be used.

Figure 2:
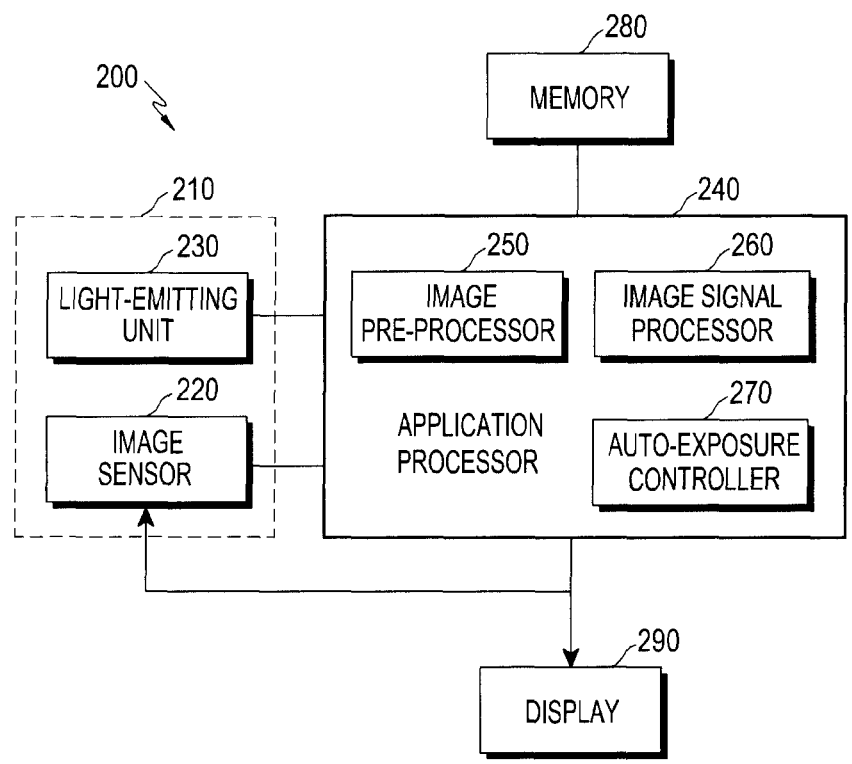
FIG. 2 is a block diagram of an example of an electronic device, according to various embodiments of the present disclosure.

FIG. 2 illustrates an electronic device 200 for adjusting the exposure by each area, according to various embodiments of the present disclosure. In this example, the electronic device 200 includes a camera module 210, an application processor (AP) 240, a memory 280, and a display 290.

The application processor 240 may include at least one of an image pre-processor 250, and an image signal processor (ISP) 260. In some aspects, the image pre-processor 250 and the image signal processor 260 may be provided separately from the application processor 240. In some aspects, the image signal processor 260 may be configured to include an auto-exposure controller 270, or the auto-exposure controller 270 may be provided separately from the application processor 240 or the image signal processor 260.

In the embodiment of the present disclosure, at least one processor, for example, the application processor 240, the image pre-processor 250, and/or the image signal processor 260, which are configured to process image data, may be disposed separately in the electronic device 200, and the image pre-processor 250 may be disposed in the front step of the image signal processor 260. Alternatively, as shown in FIG. 2, the image pre-processor 250 and the image signal processor 260 may be integrated into the application processor 240.

Although only the elements related to the present embodiments for adjusting the exposure by each area are illustrated in FIG. 2, the electronic device may further include other elements in addition to the elements above.

The camera module 210 may photograph still images or moving images according to the control of the application processor 240. Hereinafter, photographing may be referred to capturing. The camera module 210 may include a plurality of cameras, and various embodiments of the present disclosure will be described about the electronic device adopting a single camera.

The camera module 210 may include an image sensor 220 and a light-emitting unit 230 for providing an auxiliary light necessary for photographing a subject. Here, the light-emitting unit 230 may be a flash LED. According to an embodiment of the present disclosure, the subject may be illuminated by the light from the light-emitting unit 230 by turning on the light-emitting unit 230 provided in the electronic device 200.

In some aspects, an image captured before a light-emitting and an image captured after the light-emitting can be obtained, and the subject in the image can be detected using a difference of brightness between the image captured before light-emitting and the image captured after light-emitting. Hereinafter, the image captured before the light-emitting may be referred to the image of the subject not illuminated by the light from the light-emitting unit 230, and the image captured after the light-emitting may be referred to the image of the subject illuminated by the light from the light-emitting unit 230. More specifically, when the flash illuminates the subject near the electronic device, a flash light is reflected by the subject to thereby create a big difference in the brightness of the image captured before the light-emitting and the image captured after the light-emitting. When the flash illuminates a subject far from the electronic device, the flash light hardly reaches the subject to thereby make little or no difference in the brightness between the image captured before the light-emitting and the image captured after the light-emitting. Hereinafter, the subject near the electronic device may be referred to the subject in the foreground, and the subject far from the electronic device may be referred to the subject in the background. Therefore, the area in the image that makes a big difference in the brightness between the image captured before the light-emitting and the image captured after the light-emitting may be determined to be the area where the subject in the foreground is located.

The image sensor 220, which is an example of electronic sensors, may detect a light reflected from the subject and received through at least one lense, and may output electrical image signals corresponding to the detected light. The image sensor 220 may be at least one of a complementary metal oxide semiconductor sensor (CMOS), a charge coupled device (CCD) sensor, the Foveon sensor, or a complementary image sensor.

The image sensor 220 may output image signals for the photographed subject by a frame unit. The image sensor 220 may include a pixel array. The pixel array may include a plurality of pixels arranged in a matrix having rows and columns. Each pixel may include a photodiode and at least one transistors. The pixel may accumulate an electric charge generated by incident light (that is, an exposure process), a voltage based on the accumulated electric charge may indicate brightness (or illuminance) of the incident light, and the accumulated electric charge may be removed from the pixel (that is, a reset process). According to various embodiments of the present disclosure, the exposure for at least one subject area may be adjusted by regulating reset timing of the image sensor 220. Hereinafter, the subject area may be referred to the area where the subject in the foreground is located. That is, the reset timing for the subject area is adjusted so that at least one subject area has a different exposure. additionally or alternatively, the exposures may be adjusted by regulating International Organization for Standardization (ISO) speeds for the subject area so that at least one subject area has a different exposure. Hereinafter, ISO speeds may be referred to light sensitivities. Accordingly, image data created by a plurality of pixels constituting the image sensor 220 may be transferred to the image pre-processor 250. At this time, the image data created by the plurality of pixels may be divided into a subject area and an area except for the subject area through the process of detecting the subject. Hereinafter, the area except for the subject area may be referred to a background area or an area where the subject in the background is located. Since the exposures are configured to be different according to the areas, an image can be obtained in which the subject area has an improved brightness.

The image sensor 220 may have a function of adjusting the exposure thereof so that different exposures are configured according to the areas, under the control of the auto-exposure controller 270. That is, the exposures of the areas in the image sensor 220 may be adjusted by the auto-exposure controller 270. According to an embodiment of the present disclosure, the exposures of the areas may be adjusted by varying exposure time or ISO speeds. Alternatively, the exposures of the areas may be adjusted by a photoelectric transformation efficiency or an aperture setup as well.

The image pre-processor 250 may pre-process the image data from the image sensor 220 in the front step of the image signal processor 260. When the subject is photographed in a dark and indoor place, at night, or against a backlight, image data including a dark area where the image becomes black due to a lack of exposure and a saturation area where the image becomes white due to excessive exposure may be provided by the image sensor 220. In addition, the image pre-processor 250 may perform image processing such as creating brightness value data, or bad pixel correction (BPC).

As described above, the image data may be processed in the front step of the image signal processor 260 through some elements of the image pre-processor 250. In addition, other image processes except for the image processing operation of the image pre-processor 250 may be carried out by the image signal processor 260.

According to aspects of the disclosure, the image pre-processor 250 may be fully or partially implemented in the application processor 240 as shown in FIG. 2. Although the image pre-processor 250 and the image signal processor 260 are depicted in FIG. 2 as separate elements, in some implementations the image pre-processor 250 and the signal processor 260 may be integrated together.

In operation, the image signal processor 260 may receive image data photographed by the image sensor 220 in real time, and may process the image data to conform to the features (sizes, quality, resolution, or the like) of the display 290 or the features of other display units. The image processes may include, for example, gamma correction, interpolation, spatial changes, image effects, image scaling, auto-white balancing (AWB), auto-exposure (AE), auto-focus (AF), or the like. In addition, the image signal processor 260 may operate based on one of matrix photometry, touch auto-exposure (AE), central photometry, or spot photometry in an auto-exposure mode.

The image signal processor 260 may be included in the application processor 240 that performs multimedia functions for executing and controlling various additional functions such as a camera function, a multimedia data player function, or the like.

In addition, the image signal processor 260 may configure reference exposure time in an auto-exposure mode. A plurality of pixels of the image sensor 220 may be simultaneously exposed for the reference exposure time. The reference exposure time may be configured in various manners.

The image signal processor 260 may control the auto-exposure controller 270 to configure exposures to be different between a group of pixels corresponding to at least one subject area and another group of pixels corresponding to the area except for the subject area. Therefore, the auto-exposure controller 270 may control the exposures of the image sensor 220 with reference to the configured exposures, i.e., the exposure time.

The image signal processor 260 may create the entire image signal through correction on the basis of image data of each area of the image sensor 220, in which the exposures thereof are configured to be different, and may display the same on the display 290.

The display 290 may display the image signal after that signal is processed by the image signal processor 260.

The auto-exposure controller 270 may cause different portions of the image sensor 220 have different exposures that are specified by the image signal processor 260. When a photographing instruction is received, the auto-exposure controller 270 may configure exposures to be different between a group of pixels in the area where the subject is detected and a group of pixels in the other area except for the subject area.

To this end, the image signal processor 260 may perform detection of the subject in the foreground in order to divide the image data received from the image sensor 220 into the areas.

At this time, in order to detect the subject in the foreground, according to an embodiment of the present disclosure, phase detection pixels (or phase difference detection pixels) positioned on the upper surface (or the image plane/surface) of the image sensor 220 may be used. A sensor adopting phase detection pixels on the image sensor 220 may be referred to as an image plane phase detection sensor. The image plane phase detection sensor may be used to detect the subject in the foreground from the image data using relative positions of the subjects. That is, the image plane phase detection sensor may recognize an approximate distance between the electronic device 200 and the subject in the foreground.

In addition, according to another embodiment of the present disclosure, a flash mounted in the electronic device 200 emits a light, and the subject in the foreground may be detected using a difference in brightness between the image captured before the light-emitting and the image captured after the light-emitting. At least one area where the difference of brightness exceeds a critical value, may be regarded as the subject area, so at least one subject area may be identified in the image data.

According to another embodiment of the present disclosure, the user may directly select the subject in the image. For example, if the user selects the subject through a touch screen, the area surrounding the subject may be segmented. In addition, a specific area may be configured as the area of interest (ROI) according to the attention of the user manipulating the electronic device 200. To this end, the image signal processor 260 may further include a target area detection unit.

For example, the target area detection unit may configure the exposure time of the area where a face or text exists in the image to be different from those of other areas. To this end, the target area detection unit may analyze the image data to thereby detect the area where a face or text exists, based on a face recognition algorithm, a text recognition algorithm, or the like.

For example, if the exposure is excessive in the area where the subject exists, the auto-exposure controller 270 may configure the exposure time of a group of pixels corresponding to the area where the subject exists to be less than the reference exposure time. On the contrary, if the subject is detected in the area where the exposure is insufficient, the auto-exposure controller 270 may increase the exposure time to be greater than the reference exposure time.

The image signal processor 260 may determine the exposures of the segmented areas with reference to a table for determining the exposure of a group of pixels corresponding to the subject depending on distances between the subject and the electronic device, which is stored in the memory 280, and may control the auto-exposure controller 270 so that the areas (or portions) of the image sensor 220 have different exposures. The areas may be applied with different reset timing by the auto-exposure controller 270, to thereby have different exposure time from each other.

The application processor 240 may control overall operations of the electronic device 200, and may control a camera function based on an instruction for photographing received from the user.

The memory 280 may include an image buffer that stores images formed based on the image data obtained from the image sensor 220 by each frame. In addition, the memory 280 may store a table for determining the exposure of a group of pixels corresponding to the subject depending on distances between the subject and the electronic device. For example, the memory 280 may store a table showing the relationship between distances from the subject and the amount of light, and a table showing the relationship between ISO speeds and the amount of light. In addition, the memory 280 may store an auto-exposure table for determining a reference exposure time in an auto-exposure mode.

According to various embodiments of the present disclosure, the electronic device 200 may include: an image sensor that includes an array of one or more pixels, and obtains image data through the array of pixels; and at least one processor that processes the image data, wherein the processor identifies at least one subject area in the image data and controls the image sensor to have different exposures between the subject area and an area except for the subject area.

According to various embodiments of the present disclosure, the processor may adjust either exposure time or ISO speeds so that the subject area and the area except for the subject area have different exposures from each other.

According to various embodiments of the present disclosure, the processor may differently apply reset signals to the subject area and the area except for the subject area.

According to various embodiments of the present disclosure, the processor may detect at least one subject in the image data, and may separate the area corresponding to the subject.

According to various embodiments of the present disclosure, the electronic device 200 may further include an image plane phase detection sensor that detects the subject.

According to various embodiments of the present disclosure, the processor may compare the image data captured before a light-emitting (or flashing) with the image data captured after light-emitting (or the flashing), and may detect the area corresponding to the subject in the image data, based on a brightness difference between the image data.

According to various embodiments of the present disclosure, the processor may estimate a distance between the subject and the electronic device, based on the brightness difference, and may determine the exposure time according to the estimated distance of the subject.

According to various embodiments of the present disclosure, when the subject area and the area except for the subject area have different exposure time according to the determined exposure time, the processor may make a control to obtain the image data when photographing the subject with light-emitting of the flash.

According to various embodiments of the present disclosure, the electronic device 200 may further include a touch screen that displays the image data and receives a user input for selecting the subject.

Figure 3:
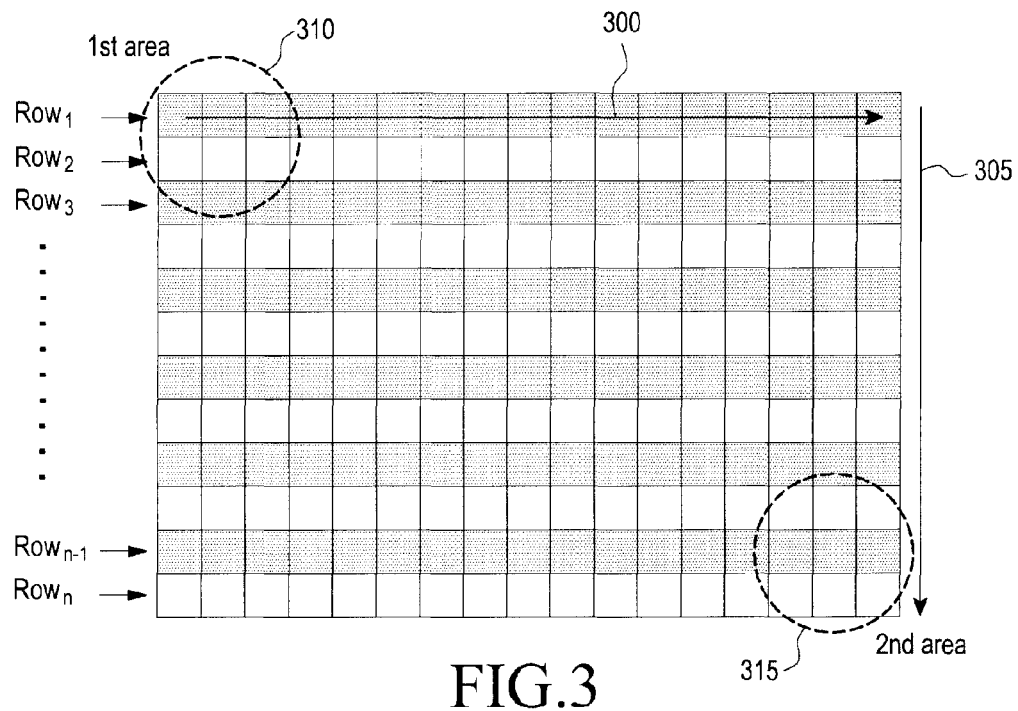
FIG. 3 is a diagram illustrating an example a data-readout method, according to various embodiments of the present disclosure.

FIG. 3 is a diagram illustrating an example of a data readout method, according to various embodiments of the present disclosure.

Referring to FIG. 3, the image sensor 220 may proceed from the first row "Row$_1$" to the right and then downwards in the direction of arrow 305 to the last row "Row$_n$," one by one to thereby read data. At this time, one frame of information recorded in the image sensor 220 cannot be obtained till reading of the last row "Row$_n$" is completed. Thus, there may be a difference in reading time between the first area 310 and the second area 315, which may cause a delay. However, since the reading sequence of the rows is fixed, the timing for reading the subject cannot be adjusted, and all of the pixels are given the same exposure.

Figure 4:
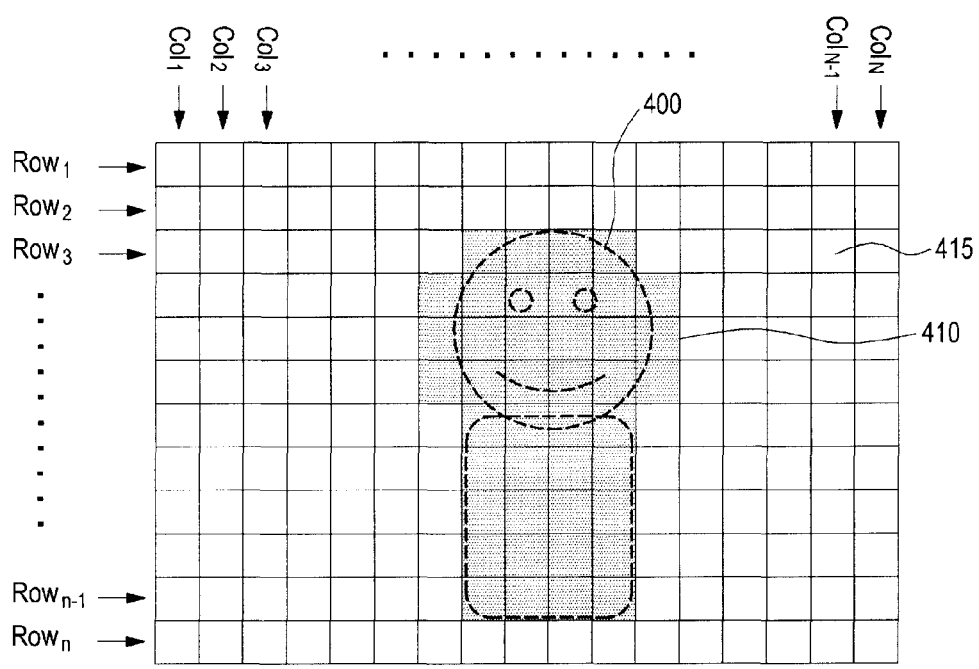
FIG. 4 is a diagram illustrating an example of a data-readout method, according to various embodiments of the present disclosure.

FIG. 4 is a diagram illustrating an example of a data readout method, according to various embodiments of the present disclosure.

Referring to FIG. 4, according to various embodiments of the present disclosure, the exposure may vary for different areas (or portions) of the image sensor 220. More specifically, the subject 400 may be detected from the image data obtained from the image sensor 220. Then, a subject area 410 of the sensor 220 that is associated with the subject 400 may be identified and distinguished from a background area 415, after which the areas 410 and 415 may be given different exposures.

According to aspects of the disclosure, the image may include a single subject area or a plurality of subject areas according to photographing a single subject or a plurality of subjects. Accordingly, the detection method of the subject may be different, i.e., a single-subject detection method and a multi-subject detection method. FIG. 5A shows an image 500 including a subject 510 that is captured without using a flash. In this image, the subject 510 and the background 505 may have similar brightness. That is, the brightness difference may be within a critical value.

FIG. 5B shows an image 515 including a subject 525 that is captured while using a flash. Here, the subject 525 and the background 520 in FIG. 5B are the same as the subject 510 and the background 505 in FIG. 5A, respectively. However, in the example of FIG. 5B a flash is used, the subject 525 may appear brighter than the subject 510 due to the light from the flash, whereas the background 520 may retain similar brightness to the background 505. Therefore, by comparing images before and after light-emitting of the flash, an area that makes a difference in the brightness may be segmented, and may be recognized as the subject area.

FIG. 6A shows an image 600 including two subjects 610 and 615, which are positioned at different distances, before light-emitting of the flash. Like FIG. 5A, there may not be a big difference in the brightness between persons, i.e., the subjects 610 and 615 positioned relatively in front and a background 605 in FIG. 6A.

FIG. 6B shows an image 620 including two subjects 630 and 635, which are positioned at different distances, after light-emitting of the flash. Referring to FIG. 6B, the amount of light reaching the subject 630 near the electronic device 200 is relatively more than that of the subject 635 relatively far from the electronic device 200, so the subject 630 may shine bright. In addition, the amount of light reaching the subject 635 relatively far from the electronic device 200 is less than that of the subject 630 near the electronic device 200, so the subject 635 may be relatively dark. Therefore, by comparing the images before and after light-emitting of the flash, an area that makes a difference in the brightness may be segmented, and a distance from the electronic device to the subject may be estimated according to the brightness difference, i.e., a ΔY value.

There is little or no difference in the brightness in the background area 625 of the image in FIG. 6B, so the first subject 630 and the second subject 635 may be identified. Accordingly, portions of an image sensor associated with the first subject 630 and the second subject 635 may be configured to have different respective exposures from each other. For example, the respective exposure of each sensor portion may depend on the distance between the image sensor 220 and the portion's respective subject.

Figure 7:
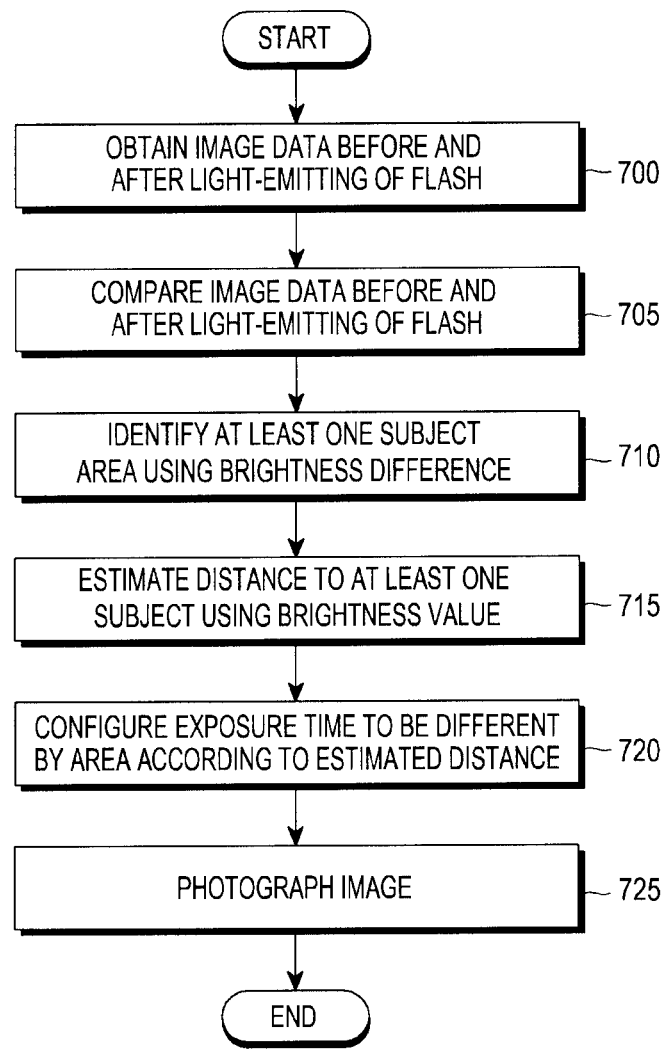
FIG. 7 is a flowchart of an example of a process, according to various embodiments of the present disclosure.

FIG. 7 is a flowchart of an example of a process, according to various embodiments of the present disclosure.

Referring to FIG. 7, the electronic device 200 may obtain image data before and after light-emitting of the flash by turning on or off the flash that illuminates the subjects in operation 700. Here, the operation of turning on/off the flash may be defined as pre-flashing that is performed before photographing the image. The pre-flashing may be the operation in which the flash gleams the predetermined number of times, for example, once, in order to measure the exposure or in order to prevent the red-eye effect. With the pre-flashing, the electronic device may detect a light reflected from the subjects, and may determine the light-emitting time of the flash or the amount of light emitted from the flash to the subject when photographing the subject. At this time, when photographing the subject using the flash, the subject which the light of the flash reaches may shine bright, whereas the background except for the subject may remain dark. Therefore, when the image is captured while using the flash, the subject area needs a short exposure and the background area needs a long exposure to obtain the image where the subject area and the background area are captured in full detail.

In order to identify the subject area and the background area, which are to be given different exposures from each other in the image obtained using the pre-flashing, the electronic device 200 may compare the image data captured before and after light-emitting of the flash in operation 705. Based on the result of the comparison, the electronic device 200 may recognize (or identify) at least one subject area in the image using a brightness difference in operation 710. For example, at least one pixel of which the brightness difference exceeds a critical value and neighboring pixels thereof may be determined to be the subject area. At this time, brightness differences in the neighboring pixels of at least one pixel exceed the critical value. In addition, one or more areas comprised of pixels of which brightness differences exceed the critical value may be determined to be the subject areas. In the case of an image including two or more subjects, the saturation or the dark portions of the subject area may be improved by configuring the exposure to be different for each subject.

According to various embodiments of the present disclosure, in the case of photographing a plurality of subjects, the distance between the electronic device and each subject may be estimated in order to configure the subjects to have different exposures from each other. In addition, in the case of photographing a single subject, the distance between the electronic device and the single subject and the distance of the background may be estimated in order to cause the single subject and the background to have different exposures. The electronic device 200 may estimate a distance between at least one subject and the electronic device 200 using a brightness value in operation 715. For example, based on the detection method of the subject as described in FIG. 6, the electronic device 200 may calculate a brightness difference between the first subject area 630 and the second subject area 635, and may estimate the distance using the brightness difference value. The method of estimating the distance using the brightness difference value will be described in detail with reference to FIG. 8.

In operation 720, the electronic device 200 may configure the exposure time of each area corresponding to each subject to be different according to the estimated distances. Since the exposure time is determined in relation to the estimated distance as described above, the electronic device 200 may photograph images with different exposures configured according to the areas of the image sensor 220 in operation 725. At this time, the image may be photographed under the normal illumination of the flash after the pre-flashing. Here, the light-emitting of the flash may be performed based on the amount of light for a flash period, which is calculated through the measurement of the brightness. Accordingly, in photographing the image using the flash, the exposure is adjusted depending on the subject areas, so the user can photograph the image in which all of subjects that are far from or close to the electronic device are sharp and clear. As set forth above, in various embodiments of the present disclosure, it should be understood that the subject areas may be identified using the pre-flashing, and the image may be photographed using the flash.

According to various embodiments of the present disclosure, the method for controlling the electronic device may include: obtaining image data using an image sensor that includes an array of one or more pixels and obtains the image data through the array of pixels; identifying at least one subject area in the image data; and controlling the image sensor to have different exposures between the subject area and an area except for the subject area.

According to various embodiments of the present disclosure, the operation of controlling the image sensor may include adjusting either exposure time or ISO speeds so that the subject area and the area except for the subject area have different exposures from each other.

According to various embodiments of the present disclosure, the operation of controlling the image sensor may include differently applying reset signals to the subject area and the area except for the subject area.

According to various embodiments of the present disclosure, the operation of identifying the subject may include detecting at least one subject in the image data, and separating the area corresponding to the subject.

According to various embodiments of the present disclosure, the operation of identifying the subject may include comparing the image data captured before pre-flashing with the image data captured after pre-flashing, and detecting the area corresponding to the subject in the image data, based on a brightness difference between the image data.

According to various embodiments of the present disclosure, the method for controlling the electronic device may further include estimating a distance between the subject and the electronic device, based on the brightness difference; and determining exposure time according to the estimated distance of the subject.

According to various embodiments of the present disclosure, the method for controlling the electronic device may further include, when the subject area and the area except for the subject area have different exposure time according to the determined exposure time, obtaining the image data using the image sensor.

According to various embodiments of the present disclosure, the image data is obtained by photographing the subject with light emitted from the flash.

According to various embodiments of the present disclosure, the operation of identifying at least one subject area in the image data may include receiving a user input for selecting the subject through a touch screen that displays the image data.

Figure 8:
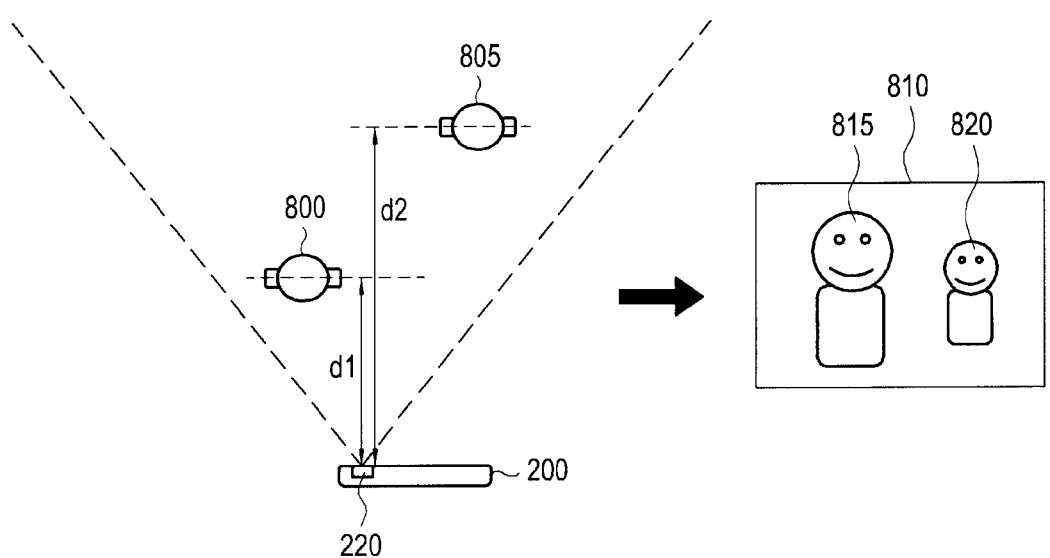
FIG. 8 is a diagram illustrating a method for estimating distances between a plurality of subjects and an electronic device, according to various embodiments of the present disclosure.

FIG. 8 is a diagram illustrating a method for estimating distances between a plurality of subjects 800 and 805 and an electronic device 200 according to various embodiments of the present disclosure. Provided that "d1" is a distance between the first subject 800 and the image sensor 220 of the electronic device 200, and "d2" is a distance between the second subject 805 and the image sensor 220, the exposure time may be configured to be proportional to the square of the distance.

According to various embodiments of the present disclosure, in order to adjust the exposure, i.e., the amount of light incident on the image sensor 220, the exposure time or the ISO speed may be regulated.

The following Table 1 shows the relationship between the distance between a subject and an electronic device and the portion of the light that is reflected off the subject that reaches an image sensor of the electronic device.

TABLE 1

| Distance | 1 | 1.4 | 2 | 2.8 | 4 | 5.6 | 8 | 11 |
|---|---|---|---|---|---|---|---|---|
| Amount of light | 1 | ½ | ¼ | ⅛ | 1/16 | 1/32 | 1/64 | 1/128 |

Referring to Table 1, the amount of light in the image sensor 220 is inversely proportional to the distance. That is, as the distance increases, the amount of light decreases. For example, the images captured before and after light-emitting of the flash may be compared with each other, and the area that makes a difference in the brightness may be separated as the subject area. In the case of photographing the first subject area 800 and the second subject area 805, since the first subject 800 is closer to the image sensor 220 of the electronic device 200 than the second subject 805, the area 815 corresponding to the first subject 800 is larger than the area 820 corresponding to the second subject 805 in the photographed image 810 as shown in FIG. 8. There may be a difference of brightness in the areas 815 and 820 of the image 810.

For example, comparing the first image data before light-emitting with the second image data after light-emitting, two subject areas 815 and 820, which have differences in brightness, may be detected in the image data due to different reflection of light from the subjects 800 and 805.

According to Table 1, if the amount of light incident on the image sensor 220 through the first subject area 815 decreases to ½ and the amount of light incident on the image sensor 220 through the second subject area 820 decreases to ¼, the distance to the second subject 805 is double the distance to the first subject 800. Therefore, the relative distance between the first subject 800 and the second subject 805 can be estimated.

For example, provided that the exposure time of the first subject 800 is "z" seconds, the distance between the first subject 800 and the image sensor 220 is "d1," and the distance between the second subject 805 and the image sensor 220 is "d2," the exposure time of the second subject 805 may be expressed as "$z(d2/d1)^2$." Referring to FIG. 8, with regard to the image detected by the image sensor 220, the first subject area 815 may be given the exposure time of "z" seconds and the second subject area 820 may be given the exposure time of "$z(d2/d1)^2$" seconds to thereby photograph the image in which two subjects have the similar brightness.

This may be expressed as Equation 1 below.

Second Exposure Time=First Exposure Time×$(d2/d1)^2$+C     Equation 1

In Equation 1, The first exposure time denotes the exposure time of the first subject area 815, and "d1" denotes the distance between the first subject 800 and the electronic device 200.

In addition, "d2" refers to the distance between the second subject 805 and the electronic device 200, and the second exposure time refers to the exposure time of the second subject area 820. Alternatively, in the case of the image having a single subject, "d2" may denote the distance between the electronic device 200 and a background. Furthermore, "C" refers to a positive or a negative constant.

As described above, the exposure time of each pixel may be configured to be proportional to the square of the distance between the electronic device 200 and the subject. Accordingly, the exposure time of the pixel may increase in proportion to the square of (d2/d1).

Meanwhile, according to another embodiment of the present disclosure, the adjustment of the ISO speed may give the same effect as the adjustment of the exposure time.

The following Table 2 shows the relationship between the ISO speed and the amount of light.

TABLE 2

| ISO | 100 | 200 | 400 | 800 | 1600 | 3200 | 6400 | 12800 |
|---|---|---|---|---|---|---|---|---|
| Amount of light | 1 | ½ | ¼ | ⅛ | 1/16 | 1/32 | 1/64 | 1/128 |

Referring to Table 2, the amount of light detected by the image sensor 220 is inversely proportional to the ISO speed. That is, as the ISO speed increases, the amount of light decreases. According to Table 2, in the case where the amount of light detected by the first subject area 815 of the image sensor 220 decreases by ½ and the amount of light incident detected by the second subject area 820 of the image sensor 220 decreases by ¼, the ISO speed of the second subject area 820 may be doubled to reduce the difference of the amount of light between the first subject area 815 and the second subject area 820.

Figure 9:
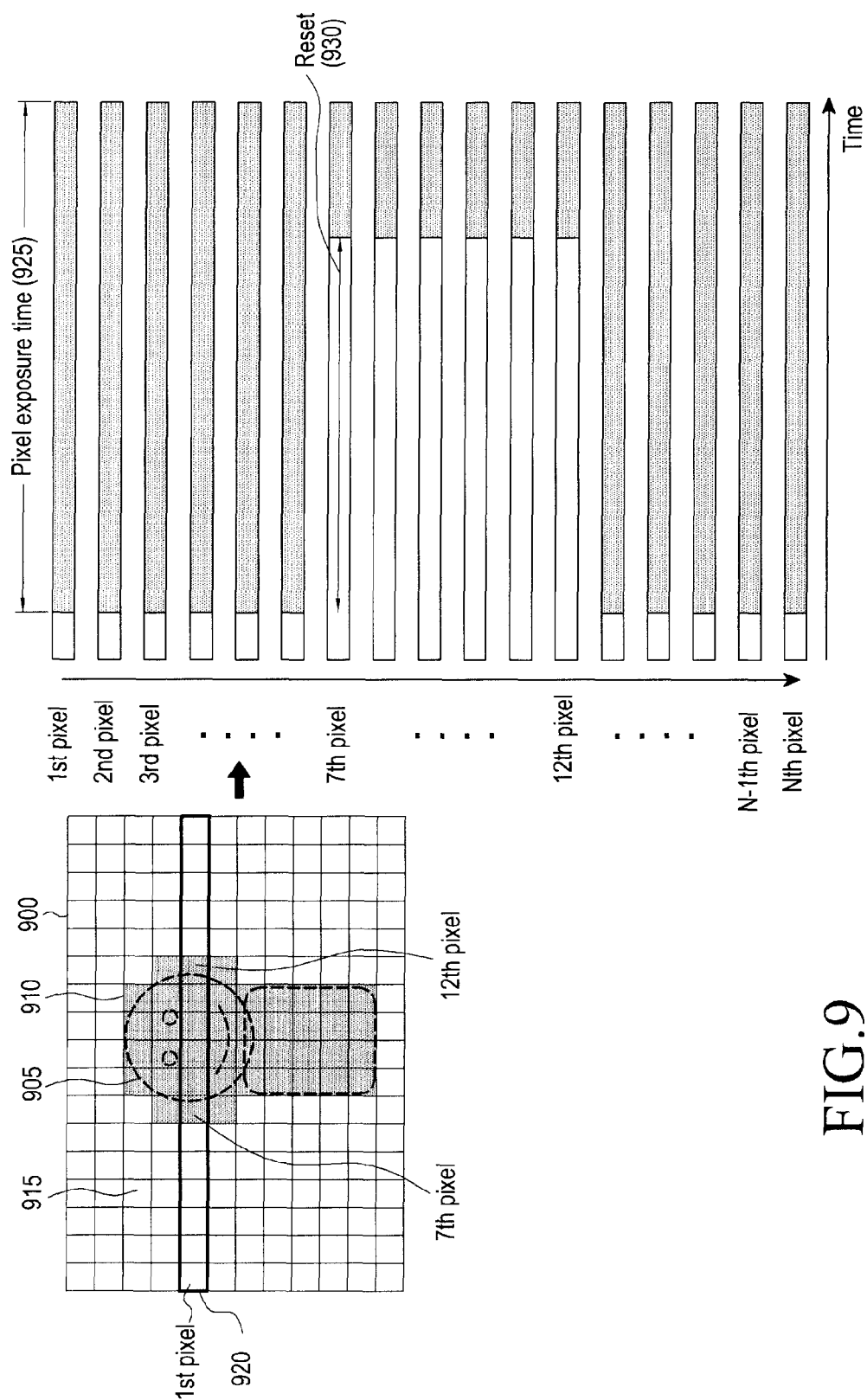
FIG. 9 is a diagram illustrating a method for adjusting exposure time by regulating reset timing of an image sensor, according to various embodiments of the present disclosure.

FIG. 9 is a diagram illustrating a method for adjusting exposure time by regulating reset timing of, according to various embodiments of the present disclosure.

Referring to FIG. 9, the electronic device 200 may divide the image 900 into areas, i.e., the area 910 where a subject 905 is detected and the area 915 including all other portions of the image except for the subject-detected area 910. The subject area 910 may be given a short exposure by adjusting the reset timing of the image sensor 220. Accordingly, the subject area 910 may be photographed to be relatively dark. Therefore, the user can take a brightness balance-improved image wherein the saturation area of the subject due to the reflection of a flash light by the subject in the dark place or at night is corrected.

As shown in FIG. 9, one row 920 may have a plurality of pixels, and the exposure of the pixels corresponding to the subject may be adjusted. When the entire image sensor 220 is about to be exposed, the pixels corresponding to the subject area 910, for example, the seventh pixel to twelfth pixel may be applied with reset signals 930 not to be exposed.

The duration of the reset signal can be calculated using Equation 2 below.

Duration of Reset Signal=Exposure Time of Background Area−Exposure Time of Subject Area   Equation 2

According to Equation 2, the background area 915 except for the subject area 910 may be exposed for the exposure time 925 thereof, and the subject area 910 may not be applied with the reset signal after the duration of the reset signal to be thereby exposed.

According to the description above, in photographing the subject using the flash, the subject, which a flash light can reach, may be given a short exposure to thereby obtain the image in which the subject is still bright, whereas the background area may be given a long exposure to thereby obtain the image in which the background area can be seen as well.

Figure 10:
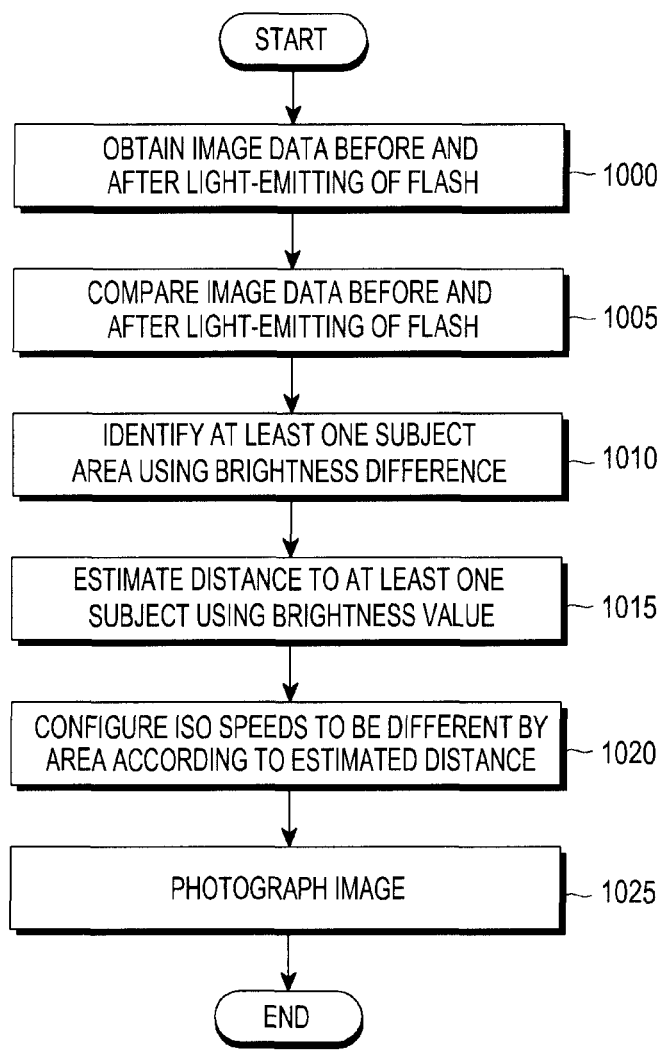
FIG. 10 is a flowchart of an example of a process, according to various embodiments of the present disclosure.

FIG. 10 is a flowchart of an example of a process, according to various embodiments of the present disclosure.

Referring to FIG. 10, the electronic device 200 may obtain image data captured before and after light-emitting of the flash using the pre-flashing by which the flash is turned on and off with respect to the subject, in operation 1000. Subsequently, in operation 1005, the electronic device 200 may compare the image data captured before and after light-emitting of the flash, and in operation 1010, the electronic device 200 may identify at least one subject area in the image using a brightness difference. Next, in order to configure each subject to have different exposure according to various embodiments of the present disclosure, a distance between the electronic device and each subject may be estimated. To this end, the electronic device 200 may estimate a distance between the electronic device and at least one subject using a brightness value in operation 1015. Operations 1000 to 1015 described in FIG. 10 may be identical to operations 700 to 715 in FIG. 7.

Afterwards, in operation 1020, the electronic device 200 may configure the respective ISO speeds of different portions of the image sensor 220 according to the estimated distances of the portions' respective subjects to the electronic device 200, and in operation 1025, the electronic device 200 may capture the image according to the configured ISO speed.

Figure 11:
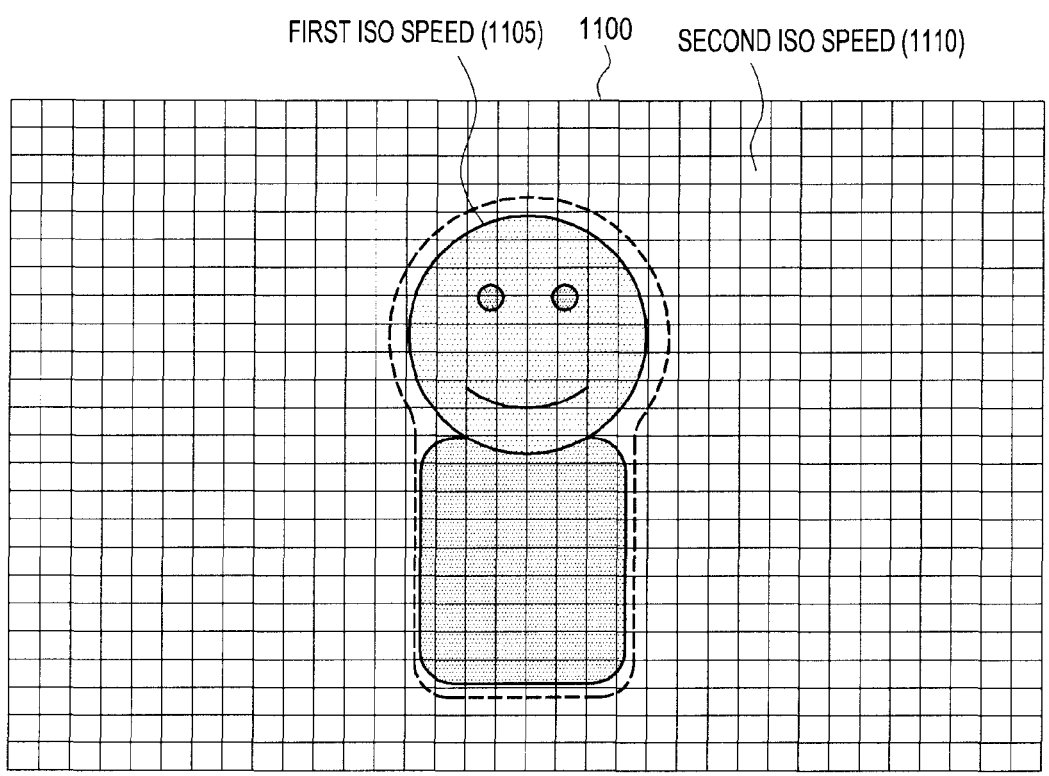
FIG. 11 is a diagram illustrating an example of a technique for capturing images, according to various embodiments of the present disclosure.

FIG. 11 is a diagram illustrating an example of a technique for capturing images. According to the technique, different ISO speeds are used between the subject area and the background area to adjust exposures thereof according to various embodiments of the present disclosure. As shown in FIG. 11, the subject area 1105 of the image 1100 may be configured with the first ISO speed, and the other area 1110 may be configured with the second ISO speed. With the different ISO speeds as described above, it is possible to obtain the same image as the case where the exposure time is adjusted by each area.

Figure 12:
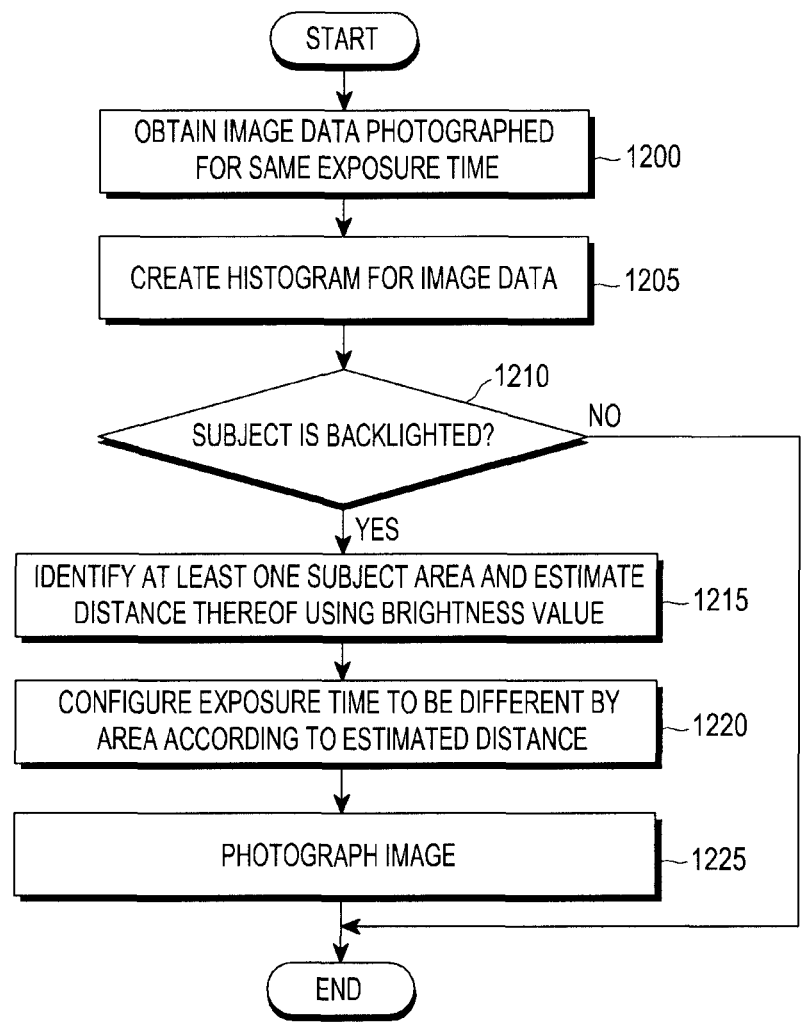
FIG. 12 is a flowchart of an example of a process, according to various embodiments of the present disclosure.

FIG. 12 is a flowchart of an example of a process, according to various embodiments of the present disclosure. Referring to FIG. 12, in operation 1200, the electronic device 200 may obtain the image data photographed at the same exposure. In operation 1205, the electronic device 200 may create a histogram for the image data, and in operation 1210, the electronic device 200 may determine whether the image is backlit based on the histogram. For example, when a bright light source is positioned behind the subject, the periphery of the subject is very bright, whereas the subject is dark, so there is a big difference in brightness between the dark area and the bright area. Therefore, if the difference in brightness between the dark area and the bright area exceeds a critical value, based on the histogram, it may be determined to be backlit.

Although the backlight is determined based on the histogram in the embodiment above, the electronic device may be transitioned into a backlight mode by the user selection and then may adjust the exposure in each area while in the backlight mode. Accordingly, the determination of backlight mode is not limited to the method above, and the operation of identifying the subject area based on the image data captured before and after light-emitting of the flash and configuring the exposure to be different according to the identified area, may be performed in the backlight mode as well. For example, in the backlight mode, the area that makes a big difference in the brightness may be regarded as the background area (or the subject area), and the area that makes little or no difference in the brightness may be regarded as the subject area (or the background area).

Therefore, if the subject is determined to be backlit in operation 1210, the electronic device 200 may identify at least one subject area in the image using the difference of brightness and may estimate a distance between the subject and the electronic device 200 in operation 1215. Subsequently, in operation 1220, the electronic device 200 may configure the exposure time to be different in each area according to the estimated distance. Next, the electronic device 200 may photograph the image for the configured exposure time in operation 1225.

In order to configure the exposure to be different by each subject according to various embodiments of the present disclosure, distances between the electronic device and each subject may be estimated. To this end, the electronic device 200 may estimate a distance between the electronic device and at least one subject using a brightness value in the same manner as that of operation 1015 of FIG. 9. At this time, in the backlight mode, the subject that looks dark may be given a long exposure and the background area may be given a shorter exposure than the subject area. That is, the reset timing may be adjusted in the opposite manner as that of the method of FIG. 9.

Figure 13:
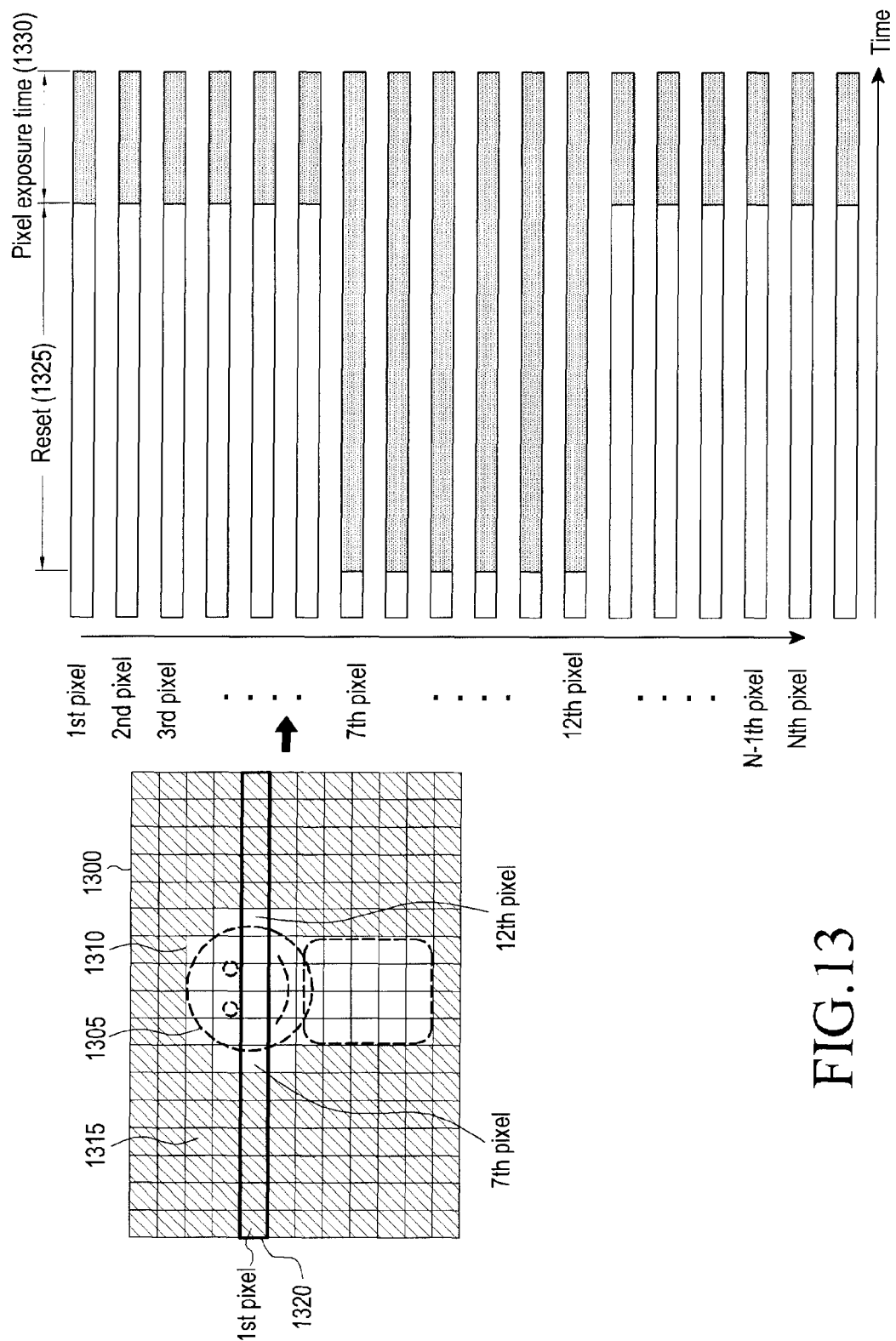
FIG. 13 is a flowchart of an example of a process, according to various embodiments of the present disclosure.

FIG. 13 is a flowchart of an example of a process, according to various embodiments of the present disclosure Referring to FIG. 13, the area 1310 of the subject 1305 is relatively dark compared to the background area 1315 in the backlight image 1300. Therefore, the subject area 1310 of the image sensor 220 may be configured to have a long exposure.

As shown in FIG. 13, one row 1320 may have a plurality of pixels, and the exposure of the pixels corresponding to the subject may be adjusted. When the pixels of the subject area 1310 in the image sensor 220 is about to be exposed, the background area 1315, for example, the first pixel to sixth pixel and thirteenth pixel to Nth pixel may be applied with reset signals 1325 not to be exposed. The background area 1315 except for the subject area 1310 may not be applied with the reset signal after the duration of reset signal 1325 to be thereby exposed for the exposure time 1330. For example, the duration of the reset signal in the backlight mode can be calculated using Equation 3 below.

Duration of Reset Signal=Exposure Time of Subject Area−Exposure Time of Background Area     Equation 3

Figure 14:
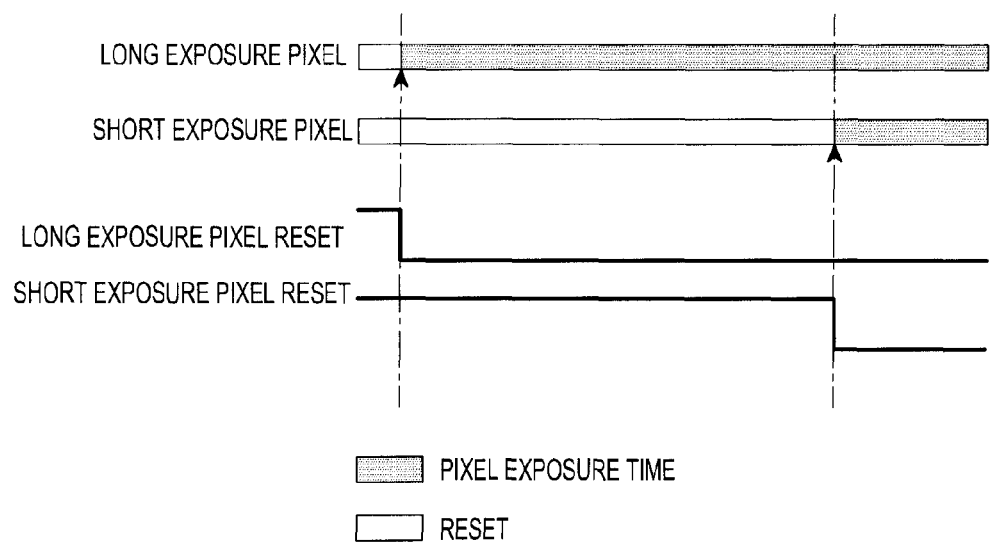
FIG. 14 is a graph illustrating the relationship between a long-exposure pixel and a short-exposure pixel depending on adjustment of reset timing, according to various embodiments of the present disclosure.

FIG. 14 is a graph illustrating the relationship between a long-exposure pixel and a short-exposure pixel depending on adjustment of the reset timing according to various embodiments of the present disclosure.

FIG. 14 shows reset timing of each pixel. When the image sensor begins to be exposed, the pixels not corresponding to the subject (or the background) may be regarded as short exposure pixels. Thus, the short exposure pixels are continuously applied with reset signals not to be thereby exposed. On the contrary, the pixels corresponding to the subject (or the background) may be regarded as long exposure pixels, and the reset signals are released so that the long exposure pixels begin to be exposed. Accordingly, since the long exposure pixels corresponding to the subject area (or the background area) are given a longer exposure time than the short exposure pixels corresponding to the background area (or the subject area), the user can take the image wherein the saturation area or the dark area exposure can be improved.

Figure 15:
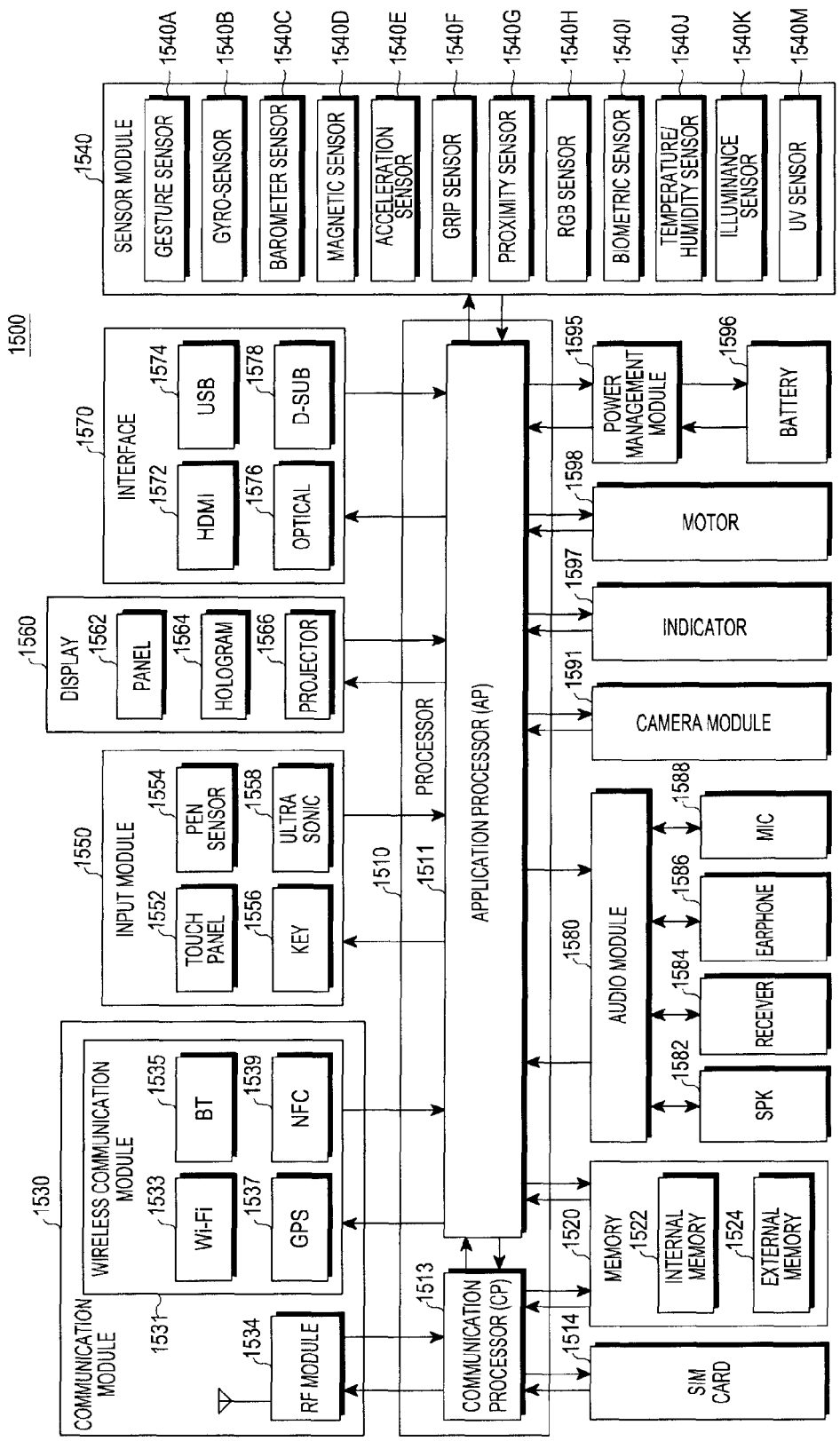
FIG. 15 is a block diagram of an electronic device hardware configuration, according to various embodiments of the present disclosure.

FIG. 15 is a block diagram of hardware 1500 according to various embodiments of the present disclosure. The hardware 1500, for example, may be the electronic device 101 of FIG. 1. Referring to FIG. 15, the hardware 1500 may include at least one processor 1510, a subscriber identification module (SIM) card 1514, a memory 1520, a communication module 1530, a sensor module 1540, an user input module 1550, a display 1560, an interface 1570, an audio module 1580, a camera module 1591, a power management module 1595, a battery 1596, an indicator 1597, and a motor 1598.

The processor 1510 (e.g., the process 120) may include at least one application processor (AP) 1511 or at least one communication processor (CP) 1513. The processor 1510 may be, for example, the processor 120 of FIG. 1. Although the AP 1511 and the CP 1513 are illustrated to be included in the processor 1510 in FIG. 15, the AP 1511 and the CP 1513 may be included in different IC packages, respectively. According to an embodiment, the AP 1511 and the CP 1513 may be included in one IC package.

The AP 1511 may control a multitude of hardware or software elements connected with the AP 1511 and perform processing of various data including multimedia data and calculation, by performing an operating system or application programs. The AP 1511 may be implemented by, for example, a system on chip (SoC). According to an embodiment, the processor 1510 may further include a graphic processing unit (GPU) (not shown).

The CP 1513 may manage data link in communications between the electronic device (e.g., the electronic device 101) including the hardware 1500 and other electronic devices, which are connected with each other through a network and may perform transformation of communication protocols. The CP 1513, for example, may be implemented by a SoC. According to an embodiment, the CP 1513 may control some of the multimedia control functions. The CP 1513 may perform identification and authentication of electronic devices in communication networks using subscriber identification modules (e.g., the SIM card 1514). In addition, the CP 1513 may provide services of voice calls, video calls, text messages, packet data, or the like.

The CP 1513 may control transmission and reception of data of the communication module 1530. Although elements, such as the CP 1513, the power management module 1595, or the memory 1520 are illustrated to be separate from the AP 1511 in FIG. 10, according to an embodiment of the present disclosure, the AP 1511 may include at least some (e.g., the CP 1513) of the above-described elements.

According to an embodiment of the present disclosure, the AP 1511 or the CP 1513 may load instructions or data received from at least one of the non-volatile memories or other elements, which are connected with the AP 1511 or the CP 1513, into volatile memories and may process the same. In addition, the AP 1511 or the CP 1513 may store data that is received from or created by at least one of other elements in non-volatile memories.

The SIM card 1514 may be a card adopting a subscriber identification module, and may be inserted into a slot formed at predetermined positions of the electronic device. The SIM card 1514 may include inherent identification information {e.g., an integrated circuit card identifier (ICCID)} or subscriber information {e.g., an international mobile subscriber identity (IMSI)}.

The memory 1520 may include an internal memory 1522 or an external memory 1524. The memory 1520 may be, for example, the memory 130 of FIG. 1. The internal memory 1522 may include at least one of volatile memories {e.g., a dynamic RAM (DRAM), a static RAM (SRAM), a synchronous dynamic RAM (SDRAM), or the like} or non-volatile Memories {e.g., an one time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like}. According to an embodiment, the internal memory 1522 may be a solid-state drive (SSD). The external memory 1524 may further include a flash drive, for example, a compact flash (CF), a secure digital (SD), a micro secure digital (Micro-SD), a mini secure digital (Mini-SD), an extreme digital (xD), a memory stick, or the like.

The communication module 1530 may include a wireless communication module 1531 or an RF module 1534. The communication module 1530 may be, for example, the communication interface 170 of FIG. 1. The wireless communication module 1531, for example, may include a Wi-Fi module 1533, a Bluetooth (BT) module 1535, a GPS module 1537, a near field communication (NFC) module 1539, or the like. For example, the wireless communication module 1531 may provide a wireless communication function using a radio frequency. Additionally or alternatively, the wireless communication module 1531 may include an network interface (e.g., LAN cards) or a modem for connecting the hardware 1500 to networks {e.g., the Internet, local area networks (LAN), wide area networks (WAN), telecommunication networks, cellular networks, satellite networks, plain old telephone services (POTS), or the like}

The RF module 1534 may transmit and receive data, for example, RF signals or electronic calling signals. Although not shown, the RF module 1534 may include, for example, a transceiver, a power amp module (PAM), a frequency filter, a low noise amplifier (LNA), or the like. For example, the RF module 1534 may further include components such as conductors or cables for transmitting and receiving electromagnetic waves through free space in wireless communications.

The sensor module 1540 may include at least one of, for example, a gesture sensor 1540A, a gyro-sensor 1540B, an atmospheric sensor 1540C, a magnetic sensor 1540D, an acceleration sensor 1540E, a grip sensor 1540F, a proximity sensor 1540G, an RGB (red-green-blue) sensor 1540H, a bio sensor 1540I, a temperature/humidity sensor 1540J, an illuminance sensor 1540K, or an ultra violet (UV) sensor 1540M. The sensor module 1540 may measure physical quantities and may detect an operation state of the electronic device, to thereby convert the measured or detected information to electric signals. Alternatively or additionally, the sensor module 1540 may further include an E-nose sensor (not shown), an electromyography sensor (EMG) (not shown), an electroencephalogram sensor (EEG) (not shown), an electrocardiogram sensor (ECG) (not shown), a fingerprint sensor, or the like. The sensor module 1540 may further include a control circuit for controlling at least one sensor included therein.

The user input module 1550 may include a touch panel 1552, a (digital) pen sensor 1554, keys 1556, or an ultrasonic input device 1558. The user input module 1550 may be, for example, the input/output interface 150 of FIG. 1. The touch panel 1552 may recognize a touch input by at least one of, for example, a capacitive type, a pressure type, an infrared type, or an ultrasonic type. In addition, the touch panel 1552 may further include a controller (not shown). In the case of a capacitive type, the proximity can be detected as well as a physical contact. The touch panel 1552 may further include a tactile layer. In this case, the touch panel 1552 may provide a user with a tactile reaction.

The (digital) pen sensor 1554, for example, may be implemented by using, for example, a method that is the identical or similar to a touch input by the user or by using a separate recognition sheet. The keys 1556 may include, for example, a keypad or a touch key. The ultrasonic input device 1558 detects acoustic waves with a microphone (e.g., a microphone 1588) in the electronic device through a pen that generates ultrasonic signals to thereby identify data. The ultrasonic input device 1558 may perform wireless recognition. According to an embodiment, the hardware 1500 may receive a user input from external devices (e.g., networks, computers, or servers 106) which are connected with the hardware using the communication module 1530.

The display 1560 may include a panel 1562, a hologram device 1564, or a projector 1566. The display module 1560 may be, for example, the display 150 of FIG. 1. The panel 1562 may be, for example, a liquid crystal displays (LCD), an active-matrix organic light-emitting diode (AM-OLED), or the like. The panel 1562 may be implemented to be, for example, flexible, transparent or wearable. The panel 1562 may be configured with the touch panel 1552 as a single module. The hologram device 1564 may display 3D images in the air by using interference of light. The projector 1566 may project light onto a screen to display an image. The screen may be located, for example, in the interior or on the exterior of the hardware 1500. According to an embodiment, the display module 1560 may further include a control circuit for control the panel 1562, the hologram device 1564 or the projector 1566.

The interface 1570 may include, for example, a high-definition multimedia interface (HDMI) 1572, a universal serial bus (UBS) 1574, an optical interface 1576, or a D-subminiature (D-sub) 1578. The interface 1570 may be included, for example, in the communication interface 170 illustrated in FIG. 1. Additionally or alternatively, the interface 1570 may include, for example, a secure digital (SD) card/multi-media card (MMC) (not shown) or an infrared data association (IrDA) (not shown).

The audio module 1580 may convert a sound into an electric signal, and vice versa. For example, the audio module 1580 may process voice information input or output through a speaker 1582, a receiver 1584, earphones 1586 or a microphone 1588.

The camera module 1591 is a device for photographing still and moving images, and it may include at least one image sensor (e.g., a front lens or a rear lens), an image signal processor (ISP) (not shown), or a flash (not shown) (e.g., LED).

The power management module 1595 may manage power of the hardware 1500. Although not shown, the power management module 1595 may include, for example, a power management integrated circuit (PMIC), a charger integrated circuit (IC), or a battery fuel gauge.

The PMIC may be mounted, for example, in integrated circuits or SoC semiconductors. The charging may be conducted by a wired type and a wireless type. The charger IC may charge a battery and may prevent inflow of an excessive voltage or current from the charger. According to an embodiment, the charger IC may include a charger IC for at least one of the wired charging type or the wireless charging type. The wireless charging type may encompass, for example, a magnetic resonance type, a magnetic induction type or an electromagnetic wave type, and additional circuits for wireless charging, for example, coil loops, resonance circuits, rectifiers, or the like, may be provided.

The battery gauge may measure, for example, the remaining power of the battery 1596, a charging voltage and current, or temperature. The battery 1596 may store or generate electric power, and may supply power to the electronic device. The battery 1596 may include, for example, a rechargeable battery.

The indicator 1597 may display a specific state, for example, a booting state, a message state or a charging state of the whole or a part (e.g., the AP 1511) of the hardware 1500. The motor 1598 may convert electric signals to a mechanical vibration. The processor 1510 may control the sensor module 1540.

Although not shown, the hardware 1500 may include a processing device (e.g., the GPU) for supporting mobile TV. The processing device for supporting mobile TV may process media data according to the standard such as, for example, digital multimedia broadcasting (DMB), digital video broadcasting (DVB) or media flow.

Each of the above-described component elements of hardware according to the present disclosure may be configured with one or more components, and the names of the corresponding component elements may vary based on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including any suitable combination of hardware, software, and/or firmware The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

FIGS. 1-15 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
   an image sensor that includes a pixel array including a plurality of pixels arranged in a matrix having rows and columns, and
   at least one processor configured to control operations of:
   obtaining an image data set;
   by processing the image data set, identifying a first pixel group including at least one first pixel corresponding to a first subject from among the plurality of pixels and a second pixel group including at least one second pixel corresponding to a second subject from among the plurality of pixels except the at least one first pixel;
   determining a first distance between the electronic device and the first subject and a second distance between the electronic device and the second subject;
   determining a first exposure setting value according to the first distance and a second exposure setting value according to the second distance;
   setting the first exposure setting value to the first pixel group corresponding to the first subject and setting the second exposure setting value to the second pixel group corresponding to the second subject; and
   capturing an image by using the image sensor in which the first pixel group corresponding to the first subject is set to the first exposure setting value and the second pixel group corresponding to the second subject is set to the second exposure setting value.

2. The electronic device of claim 1, wherein the exposure setting includes one of exposure time or ISO speed.

3. The electronic device of claim 1, wherein the image is captured by operating the first pixel group in accordance with a first reset timing and operating the second pixel group in accordance with a second reset timing.

4. The electronic device of claim 1, wherein the first pixel group is identified by processing the image data set to detect the first subject.

5. The electronic device of claim 4, further comprising an image plane phase detection sensor that detects the first subject.

6. The electronic device of claim 1, wherein a first image data of the image data set is obtained without using a flash and a second image data of the image data set is obtained by using the flash, and wherein the first pixel group and the second pixel group are identified based on a brightness difference between the first image data of the image data set and the second image data of the image data set.

7. The electronic device of claim 1, wherein the processor further configured to determine the first distance and the second distance based on brightness on the first subject and the second subject.

8. The electronic device of claim 7, wherein, when the exposure setting includes exposure time, the image is captured by using a flash.

9. The electronic device of claim 1, wherein,
the second pixel group is associated with a second subject,
the first exposure setting value includes a first exposure time value,
the second exposure setting value includes a second exposure time value, and
the second exposure time value is determined according to the equation:

Second Exposure Time Value=First Exposure Time Value×{(d2/d1)2}+C, wherein "d1" is a distance between the electronic device and the first subject, "d2" is a distance between the electronic device and the second subject, and "C" is a positive or a negative constant.

10. The electronic device of claim 1, further comprising a touch screen that displays at least one of the image data set and receives an input for selecting the first subject.

11. The electronic device of claim 1, wherein the second pixel group is a portion that fully surrounds the first pixel group.

12. A method for capturing images by using an image sensor having a pixel array including a plurality of pixels arranged in a matrix having rows and columns, the method comprising:
obtaining an image data set by using a group of pixels;
by processing the image data set, identifying a first pixel group including at least one first pixel corresponding to a first subject from among the plurality of pixels and a second pixel group including at least one second pixel corresponding to a second subject from among the plurality of pixels except the at least one first pixel;
determining a first distance between an electronic device and the first subject and a second distance between the electronic device and the second subject;
determining a first exposure setting value according to the first distance and a second exposure setting value according to the second distance;
setting the first exposure setting value to the first pixel group corresponding to the first subject and setting the second exposure setting value to the second pixel group corresponding to the second subject; and
capturing an image by using the image sensor in which first pixel group corresponding to the first subject is set to the first exposure setting value and the second pixel group corresponding to the second subject is set to the second exposure setting value.

13. The method of claim 12, wherein the exposure setting includes one of exposure time or ISO speed.

14. The method of claim 12, wherein the image is captured by operating the first pixel group in accordance with a first reset timing and operating the second pixel group in accordance with a second reset timing.

15. The method of claim 12, wherein the first pixel group is identified by processing the image data set to detect the first subject.

16. The method of claim 12, wherein:
a first image data of the image data set is obtained without using a flash and a second image data of the image data set is obtained by using the flash, and
the first pixel group and the second pixel group are identified based on a brightness difference between the first image data of the image data set and the second image data of the image data set.

17. The method of claim 12, wherein the determining the first distance and the second distance further comprising determining the first distance and the second distance, based on brightness on the first subject and the second subject.

18. The method of claim 17, further comprising, when the exposure setting includes exposure time, the image is captured by using a flash.

19. The method of claim 12, wherein:
the second pixel group is associated with a second subject,
the first exposure setting value includes a first exposure time value,
the second exposure setting value includes a second exposure time value, and
the second exposure time value is determined according to the equation:

Second Exposure Time Value=First Exposure Time Value×{(d2/d1)2}+C, wherein "d1" is a distance between the image sensor and the first subject, "d2" is a distance between the image sensor and the second subject, and "C" is a positive or a negative constant.

20. The method of claim 12, wherein the first pixel group is identified based on an input for selecting the first subject through a touch screen that displays at least one of the image data set.

21. The method of claim 12, wherein the second pixel group is a portion that fully surrounds the first pixel group.

* * * * *